Feb. 26, 1952

W. J. COULTAS 2,586,918

MOWER

Filed June 7, 1946

INVENTOR
WILBUR J. COULTAS

BY
ATTORNEYS

Feb. 26, 1952     W. J. COULTAS     2,586,918
MOWER

Filed June 7, 1946     5 Sheets-Sheet 2

INVENTOR
WILBUR J. COULTAS
BY
ATTORNEYS

Feb. 26, 1952 W. J. COULTAS 2,586,918
MOWER
Filed June 7, 1946 5 Sheets-Sheet 4

INVENTOR
WILBUR J. COULTAS
BY
ATTORNEYS

Feb. 26, 1952 W. J. COULTAS 2,586,918
MOWER
Filed June 7, 1946 5 Sheets-Sheet 5
FIG. 5
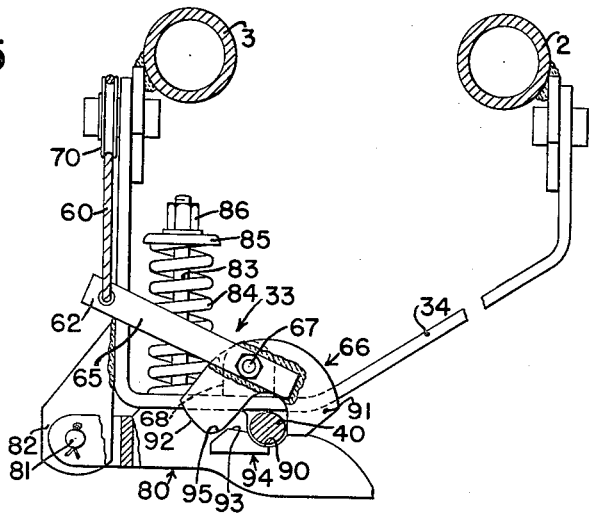
FIG. 6
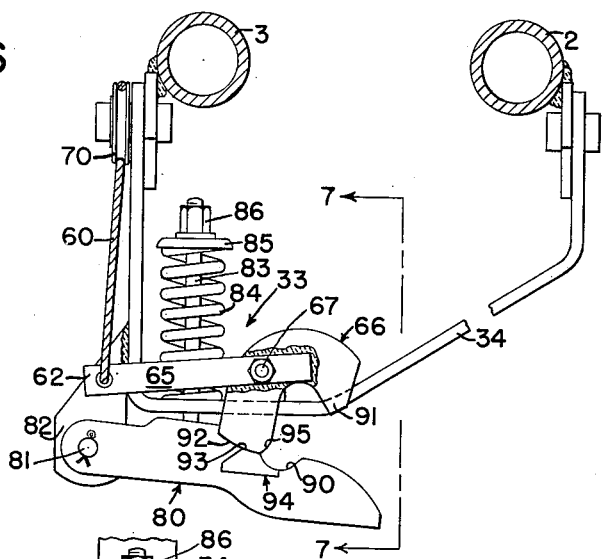
FIG. 7
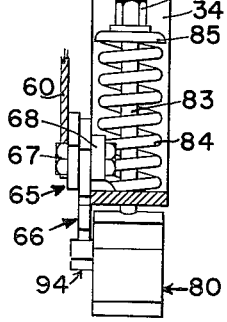
INVENTOR
WILBUR J. COULTAS
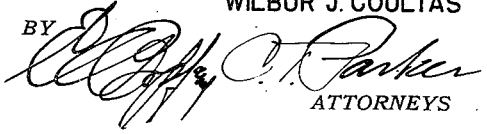
ATTORNEYS Patented Feb. 26, 1952

2,586,918

UNITED STATES PATENT OFFICE 2,586,918

MOWER

Wilbur J. Coultas, Moline, Ill., assignor to Deere & Company, Moline, Ill., a corporation of Illinois Application June 7, 1946, Serial No. 675,009

5 Claims. (Cl. 56—25)

The present invention relates generally to agricultural implements and more particularly to tractor mounted mowers of the type in which the mower cutter bar is swingably mounted on the tractor frame in such a manner as to provide for rearward movement of the cutter bar from a normal operating position in lateral extension ahead of one of the wheels of the tractor, should the cutter bar strike an obstruction. The present invention is a modification of my invention disclosed in my Patent No. 2,292,362 issued August 11, 1942, which provided a ramp mounted on the cutter bar shoe by means of which the traction wheel of the tractor rolls over the cutter bar as the latter swings rearwardly.

It is the object of the present invention to provide a mower of the above-mentioned type but which utilizes a means of stopping the tractor upon which the mower is mounted and preventing the tractor wheel from coming in contact with the cutter bar. In accomplishing this object I have provided a brake shoe mounted on the cutter bar shoe in line with the rear wheel of the tractor, so that the brake shoe comes into contact with the tractor wheel and causes the latter to stop as the cutter bar swings rearwardly.

A further object of my invention is to provide a latch mechanism for the cutter bar which includes a means for stopping the reciprocating action of the cutter bar as the latter swings rearwardly. This latch mechanism is a modification of the latch mechanism disclosed in my above-mentioned patent.

These and other objects and advantages of my invention will be apparent to those skilled in the art after a consideration of the following detailed description, taken in conjunction with the accompanying drawings.

In the drawings:

Figure 5 is a vertical section, looking forwardly, taken generally along the line 5—5 of Figure 2, and drawn to an enlarged scale;

Figure 6 is a view similar to Figure 5 but showing the latch in open position; and Figure 7 is a vertical section taken substantially along the line 7—7 of Figure 6.

Figure 1:
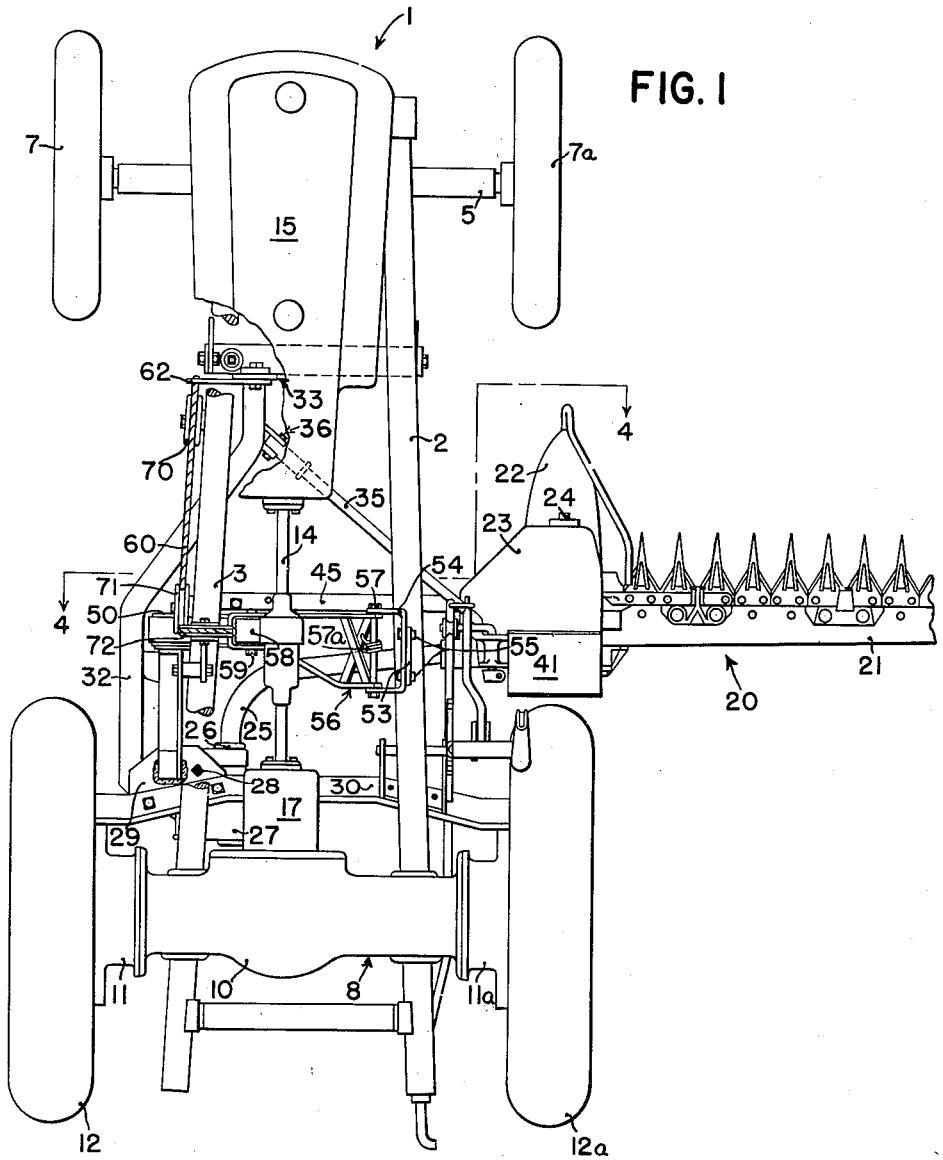
Figure 1 is a plan view of a tractor mounted mower in which the principles of the present invention have been embodied, portions of the tractor being broken away in the view to expose mower structure below.
Figure 2:
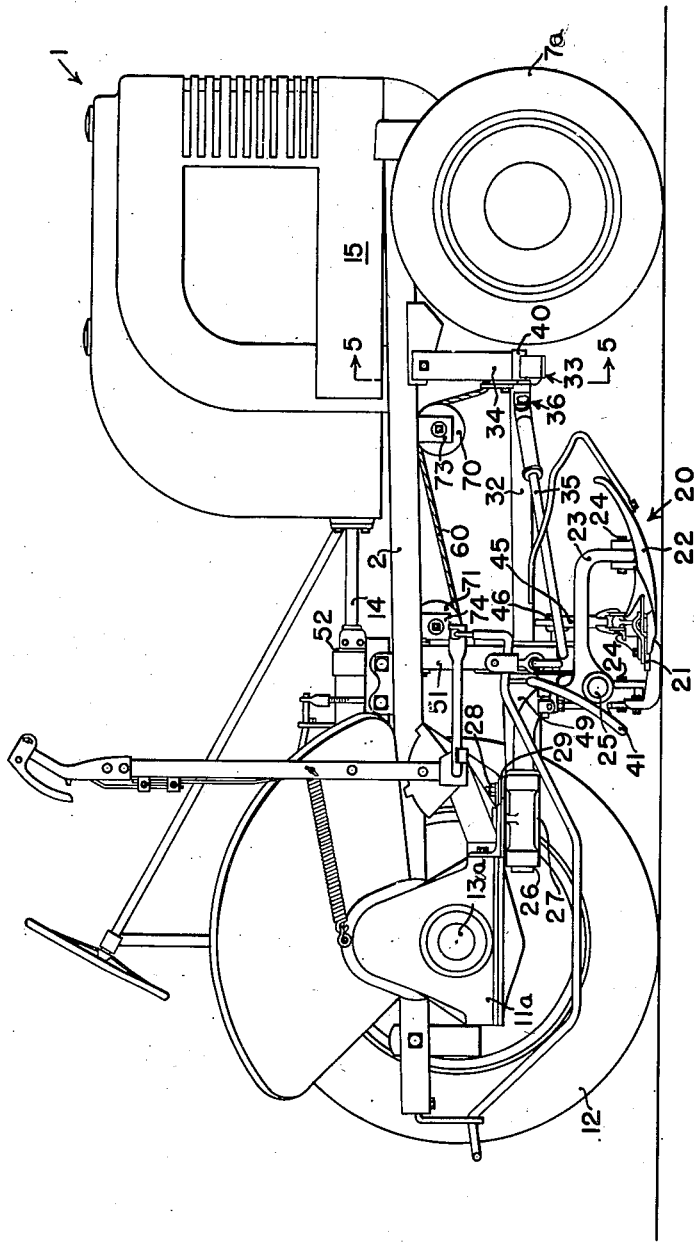
Figure 2 is a right side view of the machine shown in Figure 1, the near traction wheel being removed to expose the mower.
Figure 3:
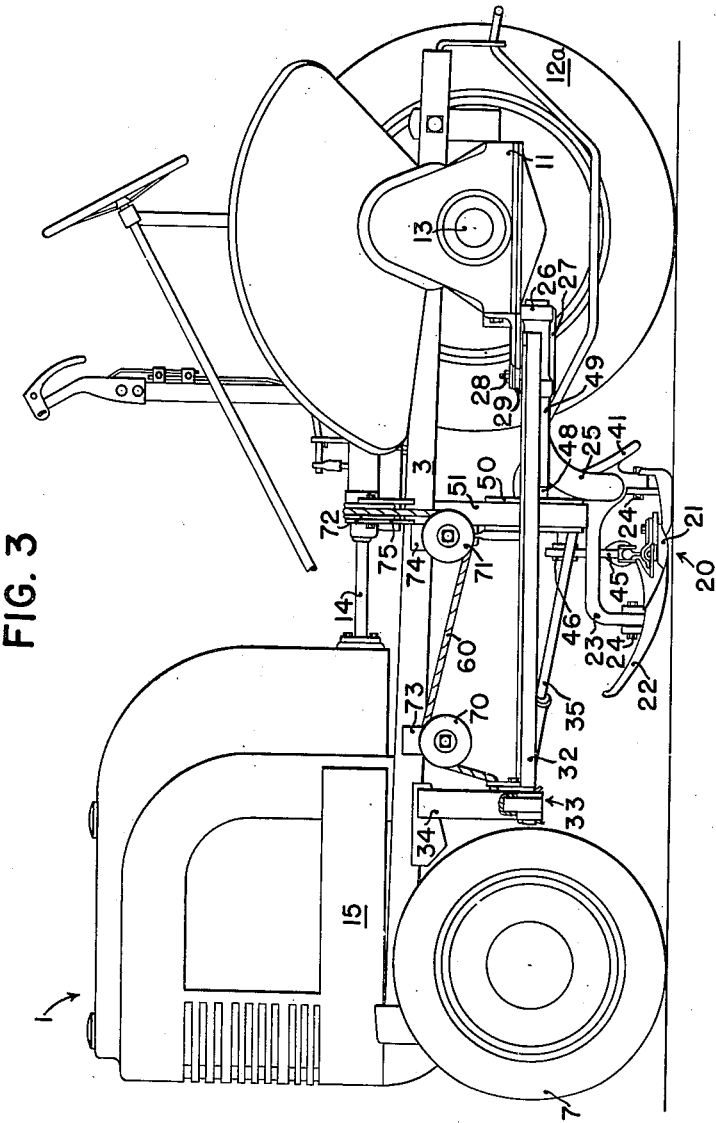
Figure 3 is a left side view of the machine shown in Figure 1, with the near traction wheel removed.
Figure 4:
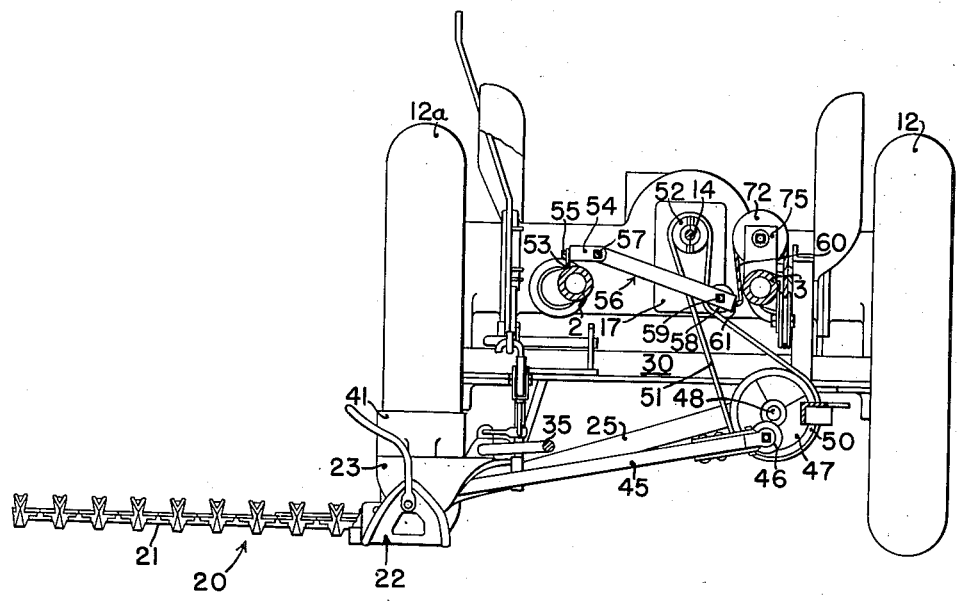
Figure 4 is a sectional view taken along the line 4—4 in Figure 1.

Referring now to the drawings, the tractor is indicated in its entirety by the reference numeral 1 and comprises a pair of generally longitudinally extending laterally spaced frame bars 2 and 3 carried at their forward ends on a transverse front axle 5 at opposite ends of which are journaled dirigible front wheels 7 and 7a. The rear ends of the frame bars 2 and 3 are rigidly fixed to a transverse rear axle housing 8 having an intermediate differential enclosure 10 and a pair of depending final drive housings 11 and 11a respectively at opposite ends of the housing 8. The depending housing 11 is at the left side of the tractor and is carried on a rear traction wheel 12 keyed to an axle 13. The right hand housing 11a is carried by a traction wheel 12a and axle 13a. The traction wheels 12 and 12a are driven from a transmission shaft 14 extending rearwardly from an engine housing 15 at the forward end of the tractor 1 and journaled at its rear end in a transmission casing 17 which contains suitable change speed gears (not shown), which are connected in a conventional manner to drive the wheel axles 13.

Mounted beneath the tractor frame intermediate the front and rear wheels is a mower 20, which is generally of the type disclosed in the above-identified Coultas patent. The mower 20 comprises a cutter bar 21 fixed to a shoe 22, which is connected to a shoe arch 23 by means of pivot bolts 24 disposed on a fore and aft extending axis, providing for vertical swinging movement of the cutter bar 21 thereabout. The shoe arch 23 is fixed to a laterally extending supporting arm 25, which curves rearwardly at its inner end and is journaled in suitable bearings 26, providing for vertical swinging movement of the arm 25 in a transverse plane. The bearings 26 are carried by a supporting casting 27 which is pivotally mounted by means of a vertical pivot bolt 28 on a plate 29; the latter being secured on a transverse beam 30 which is attached at opposite ends thereof, respectively, to the two final drive housings 11 of the tractor. A forwardly extending connecting member or latch arm 32 is fixed to the supporting casting 27, the forward end of the latch arm 32 being releasably retained by a latch mechanism 33 carried on a latch bracket 34 or second connecting member attached to the frame of the tractor. A drag link 35 is pivotally connected at 36 to the forward end of the latch arm 32 and extends rearwardly and outwardly and is connected at its rear end to the shoe arch 23 by means providing for vertical swinging movement of the latter. Thus the cutter bar 21, the supporting arm 25, the supporting casting 27, the latch arm 32 and the drag link 35 form an assembly which is pivotally associated with the tractor for swinging movement about the vertical axis of the pivot bolt 28. During normal operation, the cutter bar is disposed transversely to the line of advance of the tractor, outside the plane of the right hand traction wheel 12a, with the mower shoe 22 directly ahead of the latter, and in this position the cutter bar is secured by means of the latch mechanism 33 which engages a first latch part in the form of a stud 40 attached to the latch arm 32. When the cutter bar or shoe strikes an obstruction, such as a stump or a rock, the stud becomes disengaged from the latch, and as the forward motion of the tractor continues, the mower assembly pivots in a rearward swinging motion about the axis of the bolt 28.

The traction wheel 12a adjacent the mower shoe 22 tends to overrun the shoe but is halted, as the mower assembly swings rearwardly, by means of a steel brake shoe element 41 attached to the shoe arch 23 by any suitable means, such as welding, which brake shoe comes into contact with the traction wheel 12a. This brake shoe generally conforms to the shape of the traction wheel 12a and, although positioned below the level of the rolling axis of the wheel, is high enough to prevent the wheel from climbing over the brake shoe. The brake shoe and mower shoe provide means in which the rear surface of the brake shoe and the bottom surface of the mower shoe constitute angularly related portions engaging respectively the wheel and the ground immediately ahead of the wheel. The tendency of the frame to continue its advance after the cutter bar has encountered an obstruction causes the portions to be forced into tighter contact with the wheel and the ground. Thus the wheel is brought to a halt without damage to itself or to the mower.

The power to the mower is delivered by a pitman 45 attached to the crank portion 46 of a pitman flywheel 47. The flywheel 47 is mounted on a supporting shaft 48 journaled for rotation in a sleeve 49 which is part of the supporting casting 27. A suitable pulley 50 is mounted on the pitman flywheel 47 and is driven by a belt 51 which, in turn, is driven by a drive pulley 52 attached to the power shaft 14 of the tractor.

A supporting bracket 53 is welded to the frame bar 2 of the tractor and a U-shaped bracket 54 is attached to the bracket 53 by means of a pair of bolts 55. A belt tightener frame 56 is attached to the U-shaped bracket 54 by means of a horizontal pivot bolt 57 to provide for vertical swinging and is biased downwardly by a torsion spring 51a. An idler pulley 58 is mounted on the belt tightener frame 56 by means of an axle bolt 59 and operates to keep the belt 51 tight so as to provide power to drive the mower cutter bar 21.

A cable 60 is attached at one end to the outer extremity 61 of the belt tightener frame 56 and at the other end near the extremity 62 of a lever 65 rigidly attached to a latch holding piece or part 66 which is pivoted by means of a bolt 67 on a bracket 68 which is rigidly mounted on the latch bracket 34. The cable 60 is trained upwardly over a pulley 70, and extends rearwardly to pass under a pulley 71, upwardly and inwardly over a pulley 72 journaled on a longitudinal axis, and downwardly on the inner side of the pulley 72 to fasten upon the belt tightener frame 56. These pulleys are attached to pulley brackets 73, 74 and 75, respectively, all of which are attached to the frame bar 3 of the tractor 1.

The latch mechanism 33 comprises a latch part 80 which is pivotally connected by a pin 81 to a pivot piece 82 which is, in turn, welded to the latch bracket 34. A rod 83 is pivoted to the latch 80 and passes upwardly through an aperture in the latch bracket 34. A helical biasing spring 84 is disposed about the rod 83 and acts against the latch bracket 34 and against a cap 85 positioned by means of a nut 86 on the rod 83. Thus the spring operates in compression between the latch bracket 34 and the rod 83 to hold the latch 80 in closed position.

In normal operation, the stud 40 rests in a recess 90 in the latch 80 which is held closed by the action of the spring 84. The latch holding piece or part 66 is in the shape of a bell crank which, in the normal operating position shown in Figure 5, has one arm 91 extending downwardly adjacent the stud or latch part 40. When the cutter bar 21 strikes an obstruction, the tractor continues to move forwardly relative to the cutter bar, whereby the stud 40 is forced out of the recess 90 in the latch 80, engaging the latch holding piece 66 to rotate the latter in a counterclockwise direction. This causes the lever 65 to exert a tensional force through the cable 60 to raise the belt tightener frame 56 and idler pulley 58 against the bias of the spring 51a, loosening the belt 51 and interrupting the power drive to the cutter bar 21. At the same time, the other arm 92 of the latch holding piece 66 engages the upper surface 93 of a holding stud 94 attached to the side of the latch 80, holding the latch 80 open against the bias of the spring 84, as shown in Figure 6, and also holding the idler in belt loosening position.

Rearward swinging movement of the cutter bar relative to the tractor about the vertical pivot bolt 28 continues until the brake shoe 41 bears against the traction wheel 12a, thereby assisting in stopping the tractor.

The tractor operator then restores the mower to its operating position by backing the tractor with the cutter bar lying on the ground, thereby shifting the cutter bar forwardly relative to the tractor frame. Upon the engagement of the stud 40 with the latch 80, the stud 40 first comes into contact with the inner edge 95 of the latch holding piece 66, forcing the latter to rotate clockwise out of engagement with the holding stud 94, and allowing the latch 80 to return to closed position. The clockwise rotation of the latch holding piece 66 relieves the tension exerted on the cable 60 through the lever 65, and the spring 57a causes the belt tightener frame 56 and idler pulley 58 to tighten the belt 51 and resume the power drive to the cutter bar 21. The operator can then resume mowing operation after raising the cutter bar over the obstruction.

I do not intend my invention to be limited to the exact details shown and described herein, except as limited by the claims which follow.

I claim:

1. The combination with a tractor having a power shaft and a longitudinally extending frame carried on a pair of laterally spaced rear wheels, a mower comprising a supporting bar pivotally connected to said frame to provide for horizontal swinging and a cutter bar attached to said supporting bar, releasable latch mechanism cooperating between the mower and one of the aforesaid bars and including relatively movable latch parts normally closed to hold said mower against horizontal swinging but separable to open for releasing said mower, a power drive for said mower comprising a drive pulley attached to said power shaft, a pitman wheel having a pulley associated with said arm and swingable therewith about said pivot and operatively connected with said cutter bar, a driving belt trained over said drive pulley and said pitman pulley, a belt tightener frame pivoted adjacent one end to said frame and carrying an idler pulley at its other end engageable with said belt to connect said drive pulley to said pitman pulley, and means connected between at least one of said latch parts and the tightener frame and operative in response to relative movement of the latch parts upon opening thereof for swinging said tightener frame to loosen said belt and disconnect said power drive.

2. The combination set forth in claim 1, including a stud carried by said mower for engaging one of said latch parts, a lever pivotally connected adjacent said latch parts in such a manner that said stud when disengaged from the latch parts engages and actuates said lever as said supporting bar swings rearwardly, means for connecting the lever to the belt tightener frame so that, upon disengagement of said stud from said latch, the motion of said lever automatically swings said belt tightener frame to loosen said belt and disconnect said drive.

3. In combination with a tractor comprising a frame carried on a pair of laterally spaced rear wheel, an implement, a power drive for said implement, means mounting said implement on said frame to provide for horizontal swinging, a releasable latch mechanism including a latch part on the frame and a stud carried by said implement adapted to engage said latch part and hold said implement against horizontal swinging, and a lever having an operating connection with the power drive and mounted adjacent said latch mechanism in such a manner that said stud engages and actuates said lever upon movement of the stud relative to the latch part when said implement swings rearwardly, said lever operating to interrupt said power drive to said implement.

4. In combination with a tractor comprising a frame carried on a pair of laterally spaced rear wheels, an implement, a power drive for said implement, means mounting said implement on said frame to provide for horizontal swinging, a latch mechanism cooperating between the implement and the frame and including relatively movable parts normally in a closed condition to hold said implement against horizontal swinging arranged to open to provide for horizontal swinging of the implement, and a latch-holding mechanism cooperating between the implement and the latch mechanism and having connection with the power drive and operative upon disengagement of said implement from said latch mechanism to hold said latch parts open and also to interrupt said power drive to said implement.

5. In combination, a mobile frame having a connecting member, an implement having a connecting member, a power source for operating said implement, means mounting said implement on said frame and providing for rearward movement of said implement relative to said frame as the latter advances, a releasable latch interconnecting the implement and frame and including a first latch part on one of said connecting members and relatively movable second and third parts on the other connecting member and normally closed to engage and retain the first latch part to hold said implement in operating position and against disengagement for rearward movement, said second and third latch parts being movable to open for releasing the first latch part upon force applied to the implement tending to move the implement rearwardly relative to the frame, and means connected between at least one of said second and third latch parts and the power source and operative in response to relative opening movement of said second and third latch parts for interrupting the power to said implement.

WILBUR J. COULTAS.

REFERENCES CITED

The following references are of record in the file of this patent:

UNITED STATES PATENTS

| Number | Name | Date |
| --- | --- | --- |
| 267,328 | Cooper et al. | Nov. 14, 1882 |
| 2,288,950 | Johnson et al. | July 7, 1942 |
| 2,292,362 | Coultas | Aug. 11, 1942 |
| 2,318,274 | Westerlund | May 4, 1943 |
| 2,330,687 | Coultas et al. | Sept. 28, 1943 |
| 2,342,844 | Coultas et al. | Feb. 29, 1944 |